United States Patent [19]

Upton

[11] 3,919,776

[45] Nov. 18, 1975

[54] MEASURING APPARATUS

[76] Inventor: Terrence H. Upton, 2218 W. Granville Ave., Chicago, Ill. 60645

[22] Filed: Feb. 21, 1974

[21] Appl. No.: 444,336

[52] U.S. Cl. .................................. 33/1 N; 33/178 D

[51] Int. Cl.[2] ........................................... G01B 3/56

[58] Field of Search.. 33/1 N, 174 E, 169 D, 178 D, 33/91

[56] References Cited

UNITED STATES PATENTS 2,720,031 10/1955 Bielawa ............................ 33/174 E 3,274,693 9/1966 Witzke ............................ 33/178 D

FOREIGN PATENTS OR APPLICATIONS 126,453 5/1919 United Kingdom ............... 33/178 D

*Primary Examiner*—Richard E. Aegerter

*Assistant Examiner*—Charles E. Phillips

[57] ABSTRACT

A device for measuring the angle between intersecting planar surfaces, both interior and exterior in which means are provided to adopt one micrometer device to effect either object.

4 Claims, 6 Drawing Figures

MEASURING APPARATUS

SUMMARY OF THE INVENTION

In prior art devices the operator measures angles of intersecting planes by using apparatus commonly comprising a pair of pivotally mounted bars mounted on a screw so that rotation of the screw moves the bars towards or away from each other and the angle is measured by a rotary micrometer responsive to the rotation of the screw. In other devices of the prior art the angle is measured by a protractor mounted on one of the arms or alternately the arm may be superposed on a protractor for measurement.

A disadvantage of such devices is that sometimes the structure is such that the angle to be measured is unreachable because of intervening structure such as bosses etc., and the arms cannot touch the planar surfaces.

Another disadvantage of prior art devices is that they must be held perpendicular to the line of intersection of the surfaces. The problem is that this can only be done visually, and is thus subject to human error. Furthermore, additional difficulties are experienced with prior art devices when the structure to be measured is bowed. In that event, the operator must use his judgment to determine the line of coincidence of each leg of the measuring device. Clearly the reading would be affected not only by the judgment of operator, but his visual acuity, as well. The measuring device of the present invention obviates the difficulties of the prior art and is characterized by ease and facility of manufacture.

The description of the invention now proceeds with reference to the accompanying drawing in which:

DESCRIPTION OF THE PREFERRED EMBODIMENTS

Figures 1, 2, 3, 4, 5, 6:
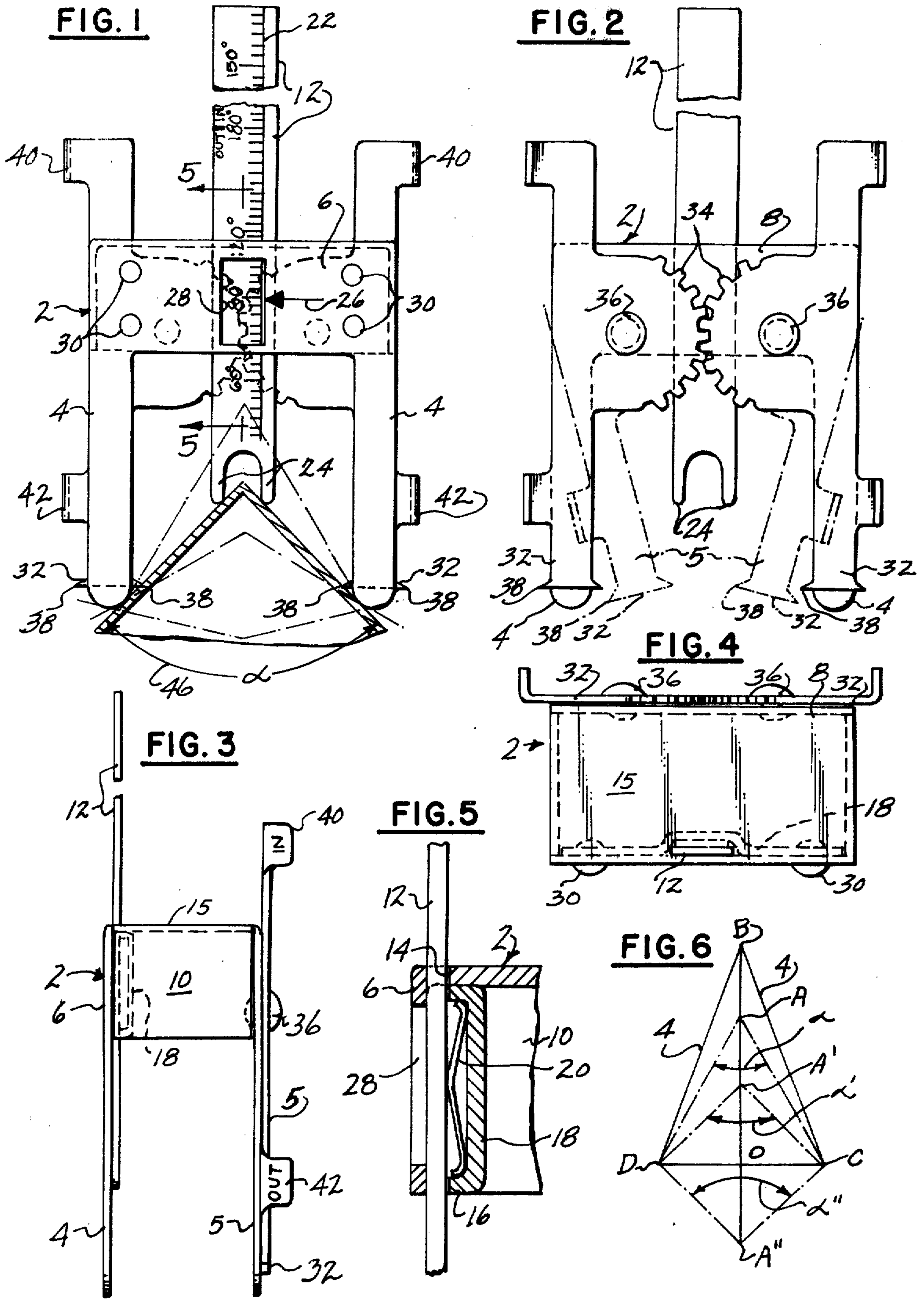
FIG. 1 is a front elevational view of the measuring device of the present invention illustrated in the position it assumes when measuring an outside angle.
FIG. 2 is a rear elevational view of the device of FIG. 1.
FIG. 3 is a side elevational view of the device of FIG. 1.
FIG. 4 is a top plan view of the device of FIG. 1.
FIG. 5 is an enlarged sectional view taken substantially on line 5—5 of FIG. 1.
FIG. 6 is a diagrammatic view of the geometric distances read by the device of the present invention.

Referring now to the drawing, and more particularly to FIGS. 1 and 2 the measuring device of the invention includes a carriage 2 in the form of a stamping illustrated as having fixed front legs 4, pivotal back legs 5, a front apron or wall 6, a rear apron or wall 8 and side aprons or walls 10.

The wall 6 has an opening 28 through which is visible a sliding scale 12 which is slidably received in a slot 14 formed in wall 6 of the frame 2. The lower end of the scale 12 is slidably received in a slot 16 formed in the lower leg of a retainer channel 18 secured to the carriage 2. A spring 20 biases the scale 12 against the back side of front wall 6. The scale 12 is calibrated directly into degrees as illustrated in FIG. 1 for accurate measurement in a manner hereafter apparent. It will be appreciated that the device works by feel. The outside angle in FIG. 1 is measured by placing the fixed legs on each side of the apex and adjusting the device so that the pivotal legs touch the surface of the workpiece. When this is done, the operator is assured that the device is on the center line of the angle, which must extend angularly equally from the apex. The scale 12 is then moved to the position illustrated in FIG. 1 and the angle of the workpiece is measured in the opening 28 at the arrow 26.

As seen best in FIG. 1 the bottom edge of the scale 12 is bifurcated as shown at 24 to straddle any radius of the intersection of the exterior angle illustrated in FIG. 1. The angle measured is indicated by arrow 26 on front wall 6. Rivets 30 are used to secure retainer 18; see FIG. 4.

As shown in FIG. 2, the legs 5 are pivotally mounted on rivets 36 and connected each to the other by gear segments 34. At the bottom of each leg 5 is a foot 32 for centering purposes. The gear segments 34 mesh with each other so that each opposite centering point 38 is exactly equidistant from the center line of the carriage 2.

The legs 5 and the feet 32 may be manually moved about the pivot axis 36. Tabs 40 are used for inside measuring while tabs 42 are used for outside measuring.

The operation of this device is best described by reference to FIG. 6. Fixed legs 4 are represented by triangle DBC and represent the main carriage 2 with contact with angles DAC, DA'C, and DA''C, which are to be measured at A, A', and A'' respectively; the lines BA, BA', and BA'' can be calibrated and read angles DAC, DA'C, and DA''C. BA'' represents the scale 12 on the instant device.

In actual operation, assuring any angle to be measured 46 in FIG. 1; main carriage 2 is grasped by the hand at side aprons 10 and placed lightly across the angle 46 as shown so that all legs 4 and 5 contact the planes of the surfaces. Then with the other hand, out tabs 42 are depressed and the carriage 2 and legs 5, rotated until contact of both inside centering points 38 is felt through "out" tabs 42. The measuring scale 12 is then depressed as shown until contact is made with the angle. The entire device can then be removed from the structured measured angle read at the position indicator 26 and calibrated divisions 22.

As can be readily understood, this device is constructed to read intersecting plane angles with a minimum exposure of surface. The use of the instrument requires no "sighting" and operates primarily by feel. In actual operation it "reads" 4 points on each side of the angle to be read. Thus this device has substantial improvements over the old.

I claim:

1. Measuring apparatus comprising a carriage having a front wall provided with an aperture, a pair of fixed dependent legs, an elongate scale slidably mounted in said carriage and being located between said legs an equal distance from each leg, and being viewable in said aperture, a back wall, a pair of legs pivotally mounted on said back wall, said last named legs being in mesh and pivoting in unison an equal amount in opposite directions to measure an interior or an exterior angle.

2. Apparatus in accordance with claim 1 wherein said movable legs are provided with a pair of tabs which may be manually engaged to bias the legs against a structure having an outside angle and a pair of tabs which may be manually engaged to bias the legs against a structure having an inside angle.

3. Apparatus in accordance with claim 2 wherein each of the movable legs is provided with a centering point for inside angle measurement and a centering point for outside angle measurement.

4. Apparatus in accordance with claim 1 wherein said scale is calibrated to indicate in degrees the angle movable legs must assume to touch the surface of the structure whose angle is measured.

* * * * *